(12) United States Patent
Palumbo et al.

(10) Patent No.: US 11,312,478 B2
(45) Date of Patent: Apr. 26, 2022

(54) ADAPTIVE PHASE CONTROL ARCHITECTURE FOR REDUCTION OF COMMUNITY NOISE FROM DISTRIBUTED PROPULSION VEHICLES

(71) Applicant: UNITED STATES OF AMERICA AS REPRESENTED BY THE ADMINISTRATOR OF NASA, Washington, DC (US)

(72) Inventors: Daniel L. Palumbo, Newport News, VA (US); Kyle A. Pascioni, Hampton, VA (US); Stephen A. Rizzi, Newport News, VA (US)

(73) Assignee: UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 141 days.

(21) Appl. No.: 16/196,960

(22) Filed: Nov. 20, 2018

(65) Prior Publication Data
US 2019/0161169 A1   May 30, 2019

Related U.S. Application Data

(60) Provisional application No. 62/667,924, filed on May 7, 2018, provisional application No. 62/590,722, filed on Nov. 27, 2017.

(51) Int. Cl.
*B64C 11/50* (2006.01)
*B64C 11/48* (2006.01)
(Continued)

(52) U.S. Cl.
CPC .............. *B64C 11/50* (2013.01); *B64C 11/48* (2013.01); *B64D 27/02* (2013.01); *G10K 11/175* (2013.01); *B64C 2220/00* (2013.01)

(58) Field of Classification Search
CPC ..... B64C 11/50; B64C 11/48; B64C 2220/00; B64D 27/02; G10K 11/175
See application file for complete search history.

(56) References Cited

U.S. PATENT DOCUMENTS 4,947,356 A * 8/1990 Elliott ....................... B64C 1/40
                                                        700/280
5,066,195 A * 11/1991 Dobrzynski ............ B64C 11/00
                                                        416/124

(Continued)

OTHER PUBLICATIONS

Rizzi et al., "Annoyance to Noise Produced by a Distributed Electric Propulsion High-Lift System", 23rd AIAA/CEAS Aeroacoustics Conference, Jun. 5-9, 2017, Denver, CO, AIAA Paper 2017-4050, pp. 1-10.

(Continued)

*Primary Examiner* — Rami Khatib
*Assistant Examiner* — Gabriel J. Lambert
(74) *Attorney, Agent, or Firm* — Robin W. Edwards; Helen M. Galus

(57) ABSTRACT

A method for adaptive phase control of a distributed propulsion (DP) aircraft includes deriving an estimated source noise level of the aircraft's propulsors with respect to a designated low-noise area on the ground. Responsive to the estimated source noise level, a phase generator module estimates a ground noise level using the source noise level. The method includes determining an optimized set of relative azimuthal propulsor blade positions/phase angles, via the phase generator module, with such optimized phase angles being sufficient for reducing the estimated ground noise level. Phase control signals from a flight controller to the respective propulsors establishes the optimized set of relative phase angles, and thereby reduces community noise in the designated low-noise area. The DP aircraft includes an aircraft body, the flight controller, and the above-noted phase generator module.

20 Claims, 6 Drawing Sheets

(51) Int. Cl.
    *B64D 27/02*     (2006.01)
    *G10K 11/175*     (2006.01)

(56) References Cited

U.S. PATENT DOCUMENTS

| | | | | |
|---|---|---|---|---|
| 5,789,678 | A * | 8/1998 | Pla | B64C 11/50 |
| | | | | 244/1 N |
| 9,442,496 | B1 * | 9/2016 | Beckman | G05D 19/02 |
| 9,816,529 | B2 * | 11/2017 | Grissom | F04D 29/665 |
| 9,889,931 | B2 * | 2/2018 | Xu | B64C 39/024 |
| 10,013,900 | B2 * | 7/2018 | Beckman | G09F 13/00 |
| 10,399,689 | B2 * | 9/2019 | Darnell | G01C 21/20 |
| 10,435,148 | B2 * | 10/2019 | Kearney-Fischer | |
| | | | | B64C 39/024 |
| 10,583,914 | B2 * | 3/2020 | Beckman | B64C 39/024 |
| 10,618,633 | B1 * | 4/2020 | Johnston | B64C 11/02 |
| 2004/0018086 | A1 * | 1/2004 | Borchers | G10K 11/175 |
| | | | | 416/1 |
| 2006/0111818 | A1 * | 5/2006 | Ishii | G01C 23/00 |
| | | | | 701/3 |
| 2018/0319491 | A1 * | 11/2018 | Kearney-Fischer | |
| | | | | G10K 11/17813 |
| 2018/0346139 | A1 * | 12/2018 | Ferran | B64D 27/24 |
| 2019/0161169 | A1 * | 5/2019 | Palumbo | B64C 11/48 |

OTHER PUBLICATIONS

Galles et al., "Feedback Control of Flight Speed to Reduce Unmanned Aerial System Noise", 24th AIAA/CEAS Aeroacoustics Conference, Jun. 25-29, 2018, Atlanta, GA, AIAA Paper 2018-2950, pp. 1-10.

Fredericks et al., "Benefits of Hybrid-Electric Propulsion to Achieve 4x Increase in Cruise Efficiency for a VTOL Aircraft", AIAA Aviation Technology, Integration, and Operations (ATIO) Conference, AIAA Paper 2013-4324, 2013, pp. 1-21.

Huff et al., "Motor Noise for Electric Powered Aircraft", 22nd AIAA/CEAS Aeroacoustics Conference, May 30-Jun. 1, 2016, Lyon France, AIAA Paper 2016-2882, 2016, pp. 1-12.

Rothhaar et al., "NASA Langley Distributed Propulsion VTOL Tilt-Wing Aircraft Testing, Modeling, Simulation, Control, and Flight Test Development", 14th AIAA Aviation Technology, Integration, and Operations Conference, AIAA Paper 2014-2999, 2014, pp. 1-14.

Nguygen et al., "A Users Guide for the NASA ANOPP Propeller Analysis System", NASA CR-4768, Feb. 1997, pp. 1-104.

Farassat, F., "Theory of Noise Generation from Moving Bodies with an Application to Helicopter Rotors," NASA TR-R-451, Dec. 1975, pp. 1-63.

Johnston et al., "Propeller Signatures and Their Use", Journal of Aircraft, AIAA 6th Aeroacoustics Conference, Hartford, CT, Jun. 4-6, 1980; AIAA 80-1035R, vol. 18, 1981, pp. 934-942.

Magliozzi et al., "Synchrophasing for Cabin Noise Reduction of Propeller-Driven Airplanes", 8th AIAA Aeroacoustics Conference, Atlanta, GA, Apr. 11-13, 1993; AIAA Paper 1983-0717, 1983, pp. 1-8.

Huang et al., "Propeller Synchrophase Angle Optimization of Turboprop-Driven Aircraft—An Experimental Investigation", Journal of Engineering for Gas Turbines and Power, vol. 136; Nov. 2014, pp. 112606-1-112606-9.

Zawodny et al., "Acoustic Characterization and Prediction of Representative, Small-Scale Rotary-Wing Unmanned Aircraft System Components", 72nd American Helicopter Society (AHS) Annual Forum, 2016, pp. 1-15.

Pascioni et al., "Tonal Noise Prediction of a Distributed Propulsion Unmanned Aerial Vehicle", 24th AIAA/CEAS Aeroacoustics Conference, JAIAA Paper 2018-2951, 2018, pp. 1-18.

Pascioni et al., "Auralization of an Unmanned Aerial Vehicle Under Propeller Phase Control", Inter-Noise 2018 Impact of Noise Control Engineering, Aug. 26-29, Chicago, IL., pp. 1-11.

* cited by examiner

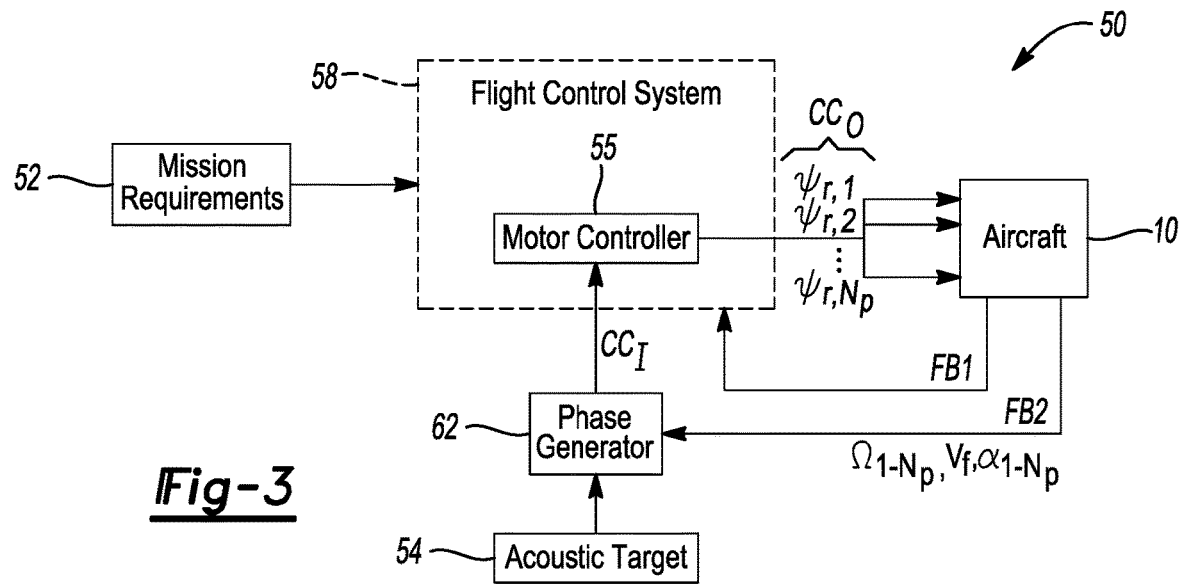
*Fig-3*
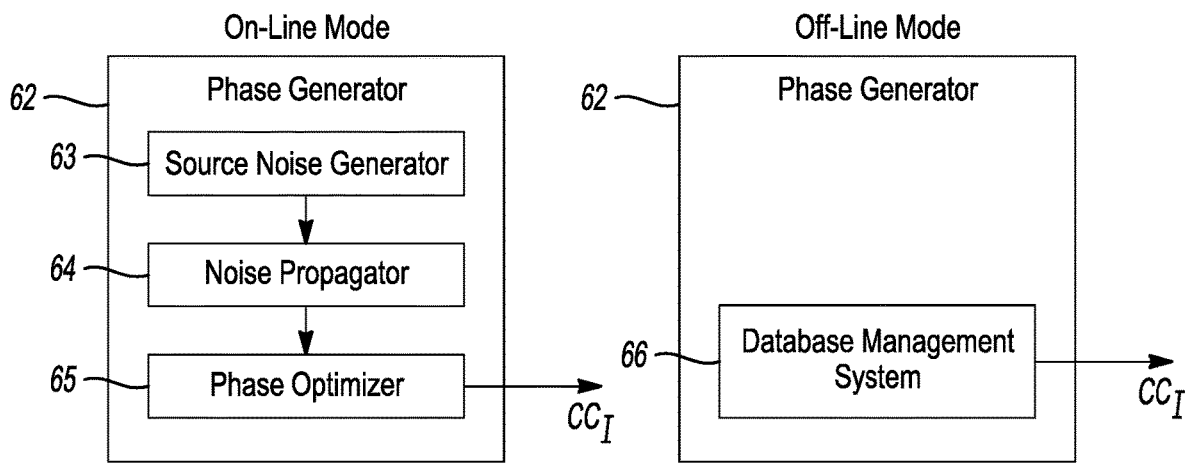
*Fig-4A*  *Fig-4B*

ADAPTIVE PHASE CONTROL ARCHITECTURE FOR REDUCTION OF COMMUNITY NOISE FROM DISTRIBUTED PROPULSION VEHICLES

CROSS-REFERENCE TO RELATED PATENT APPLICATION(S)

This patent application claims the benefit of and priority to U.S. Provisional Patent Application Ser. No. 62/590,722, filed on Nov. 27, 2017, and U.S. Provisional Patent Application Ser. No. 62/667,924, filed on May 7, 2018, the contents of each hereby incorporated by reference in their entireties.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Distributed Propulsion (DP) refers to the placement of propellers, rotors, or other propulsors at different locations aboard an airborne vehicle. Distributed Electric Propulsion (DEP) is a particular form of DP in which the propulsors are driven by electric motors. For aircraft designers, providing an aircraft with a DP capability opens up new degrees of freedom within the context of aerodynamics and flight control. Small/medium-sized unmanned aerial vehicles (UAVs), urban air mobility (UAM) systems, and thin/short-haul aircraft concepts all exploit DP in the performance of their respective missions. However, it is anticipated that propulsor noise will remain a key barrier to entry into service for DP aircraft, particularly those employing a large number of distributed propulsors.

Propulsion noise of DP aircraft is expected to differ from the types and levels of noise generated by conventional fixed wing and rotary aircraft. Coherent noise sources, e.g., multiple propellers operating at the same rotational speed, can generate complicated acoustic directivity patterns that are difficult to accurately predict, particularly when diverging from ideal flight conditions. As flight operations may require a given DP aircraft to follow flight paths that pass in close proximity to noise-sensitive areas such as residential communities or school zones, there remains a need for improved techniques for control of community noise.

SUMMARY

A method for controlling community noise from a Distributed Propulsion (DP) aircraft is disclosed herein. The method applies to aerodynamically-generated tonal noise of propulsors of the DP aircraft, which typically dominates the total noise received on the ground in comparison to other noise sources, including broadband and electric motor noise. Current aircraft community noise reduction techniques for propeller-driven and rotor-driven vehicles tend to focus on the strategic placement of propulsors with respect to one another to reduce propulsor/propulsor interactions, and with respect to the airframe to reduce propulsor/airframe interactions, while also focusing on low-noise propeller/rotor designs and/or reduction of propeller/rotor tip speed. However, such solutions may be less than ideal for certain missions or platforms, because they have limited effect on the noise source directivity, that is, the noise radiation pattern, and could negatively affect performance.

The present disclosure provides an alternative or complementary strategy to source-based noise control solutions. In particular, the noise control strategy disclosed herein includes modifying operation of the DP system by selectively controlling the relative phase (azimuthal blade positions) of each of the aircraft's individual propulsors. As the aircraft approaches a designated noise-sensitive area, such as a residential area or a school zone, or as the aircraft approaches a target area during a surveillance and reconnaissance mission, an onboard flight controller automatically directs propulsor noise away from the designated noise-sensitive area using input from a phase generator module, with the phase generator module purposefully varying the respective phases of the various propulsors to meet an acoustic target.

As part of the present approach, a source noise generator block of the phase generator module, for example the Propeller Analysis System (PAS) or another suitable acoustic model or methodology, may be used to model or otherwise estimate source noise, e.g., using individual propulsor thickness and loading noise at one or more observer points located on the ground plane below the aircraft. Such estimation may involve the real-time or a priori computation of aerodynamic blade loading of each propulsor blade when the propulsors are embodied as multi-bladed propeller assemblies. As will be appreciated by those of ordinary skill in the art, PAS and other acoustic prediction tools are able to model the acoustic spectrum of the individual propulsors. Individual ray paths for each propulsor-observer combination may be determined knowing the aircraft's position with respect to a set of ground observers. Using superposition of the respective acoustic contributions of the various propulsors, the total acoustic spectrum at each observer point is estimated as a ground noise level, e.g., using an acoustic propagator logic block of the above-noted phase generator module.

The flight control system, operating with input from the phase generator module in an embodiment of the present method, can effectively minimize a spatially-averaged root mean square (rms) pressure, and hence the spatially-averaged sound pressure level (SPL) measured in decibels, over the defined set of ground observers. In other words, the flight controller minimizes SPL by adjusting the relative phase of each propulsor (or a designated subset of such propulsors) as prescribed by a phase optimizer logic block of the above-noted phase generator module. This may occur in mission time, i.e., while the DP aircraft is in flight in proximity to the low-noise area, with "mission time" being a time scale relevant to executing the mission.

The method according to a non-limiting example embodiment includes deriving, via the phase generator module in response to input signals, an estimated source noise level of the propulsors. The method further includes deriving, via the phase generator module using the estimated source noise level, an estimated ground noise level in a designated low-noise area located on a ground plane proximate a flight path of the DP aircraft. Additionally, the method includes determining an optimized set of relative phase angles of the propulsors, via the phase generator module, with the optimized set of relative phase angles being sufficient for minimizing the estimated ground noise level at a plurality of observer locations on the ground plane. Responsive to the optimized set of relative phase angles, the method includes transmitting phase control signals from the flight controller to one or more of the propulsors to thereby establish the optimized set of relative phase angles.

The propulsors may be optionally embodied as propeller assemblies each having a respective plurality of propeller blades, with the input signals including, in this configuration, both fixed and dynamically-changing parameters. The fixed parameters may include a number, geometry, and relative spacing of the propeller assemblies and propeller blades. The dynamically-changing parameters may include a flight mode of the DP aircraft, e.g., VTOL, hover, forward-flight, etc., as well as an air speed of the DP aircraft, a rotational speed of the propellers, an attitude of the DP aircraft, atmospheric conditions, and a position of the DP aircraft relative to the designated low-noise area.

Deriving the estimated ground noise level may include determining, via a noise propagator block of the phase generator module, a set of individual ray paths extending between each of the propulsors and each of the observer locations to thereby account for atmospheric propagation effects on the estimated source noise level.

Deriving the estimated source noise level may include using an acoustic model of a source noise generator block, with such a step being performed in conjunction with other steps of the method in mission-time.

Determining the optimized set of relative phase angles may include using an optimizer function of a phase optimizer block of the phase generator module to derive the optimized set of phase angles.

The phase generator module in some embodiments includes a database populated with a table of predetermined relative phase angles and corresponding operating conditions for the predetermined relative phase angles. In such an embodiment, the method may further include extracting the optimized set of phase angles from the table under actual operating conditions that substantially match the corresponding operating conditions.

In some embodiments, the phase control signals may be transmitted to a designated subgroup of the propulsors located in one or more predetermined areas of the DP aircraft.

A phase generator module is also disclosed for use in adaptive phase control of a DP aircraft having a flight controller configured, responsive to a set of optimized relative phase angles, to output corresponding phase commands to propulsors of the DP aircraft. The phase generator module may include a source noise generator block, a noise propagator block, and a phase optimizer block. The source noise generator block is configured to derive an estimated source noise level of the propulsors using an acoustic model. The noise propagator block, in response to the estimated source noise level, estimates a ground noise level of the propulsors in a predetermined low-noise area located on a ground plane proximate a flight path of the DP aircraft. The phase optimizer block is configured to determine the optimized set of relative phase angles using an optimizer function, with the optimized set of relative phase angles being sufficient for minimizing the estimated ground noise level at a plurality of observer locations on the ground plane. The phase optimizer block also transmits the optimized set of relative phase angles to the flight controller.

A DP aircraft is also disclosed. In a possible embodiment, the aircraft includes an aircraft body, a plurality of propulsors distributed with respect to each other and the aircraft body, a flight controller, and a phase generator module. The flight controller is in communication with the propulsors and is configured, responsive to a set of optimized phase angles, to output corresponding phase commands to the propulsors. The phase generator module is in communication with the flight controller and is configured to derive, in response to a set of input signals, an estimated source noise level of the propulsors with respect to a designated low-noise area located on a ground plane proximate a flight path of the DP aircraft.

Additionally, the phase generator module is configured to estimate a ground noise level at a plurality of observer locations, including generating individual ray paths between each of the propulsors and each of the observer locations to thereby account for atmospheric propagation effects on the estimated source noise level. Responsive to the estimated ground noise level, the phase generator module determines an optimized set of relative phase angles of the propulsors, with the optimized set of relative phase angles being sufficient for reducing the estimated ground noise level. The phase generator module also transmits the optimized set of relative phase angles to the flight controller, which in turn is configured, responsive to the optimized set of relative phase angles, to establish the optimized set of relative phase angles via phase control of the propulsors.

These and other features, advantages, and objects of the present disclosure will be further understood and appreciated by those skilled in the art by reference to the following specification, claims, and appended drawings.

BRIEF DESCRIPTION OF THE SEVERAL VIEWS OF THE DRAWINGS

FIG. 3 is a schematic control flow diagram for implementing a mission-time phase control system aboard the example aircraft of FIGS. 1, 2A, and 2B.

FIGS. 4A and 4B schematically depict two possible operating modes of the phase generator module shown in FIG. 3.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Figure 1:
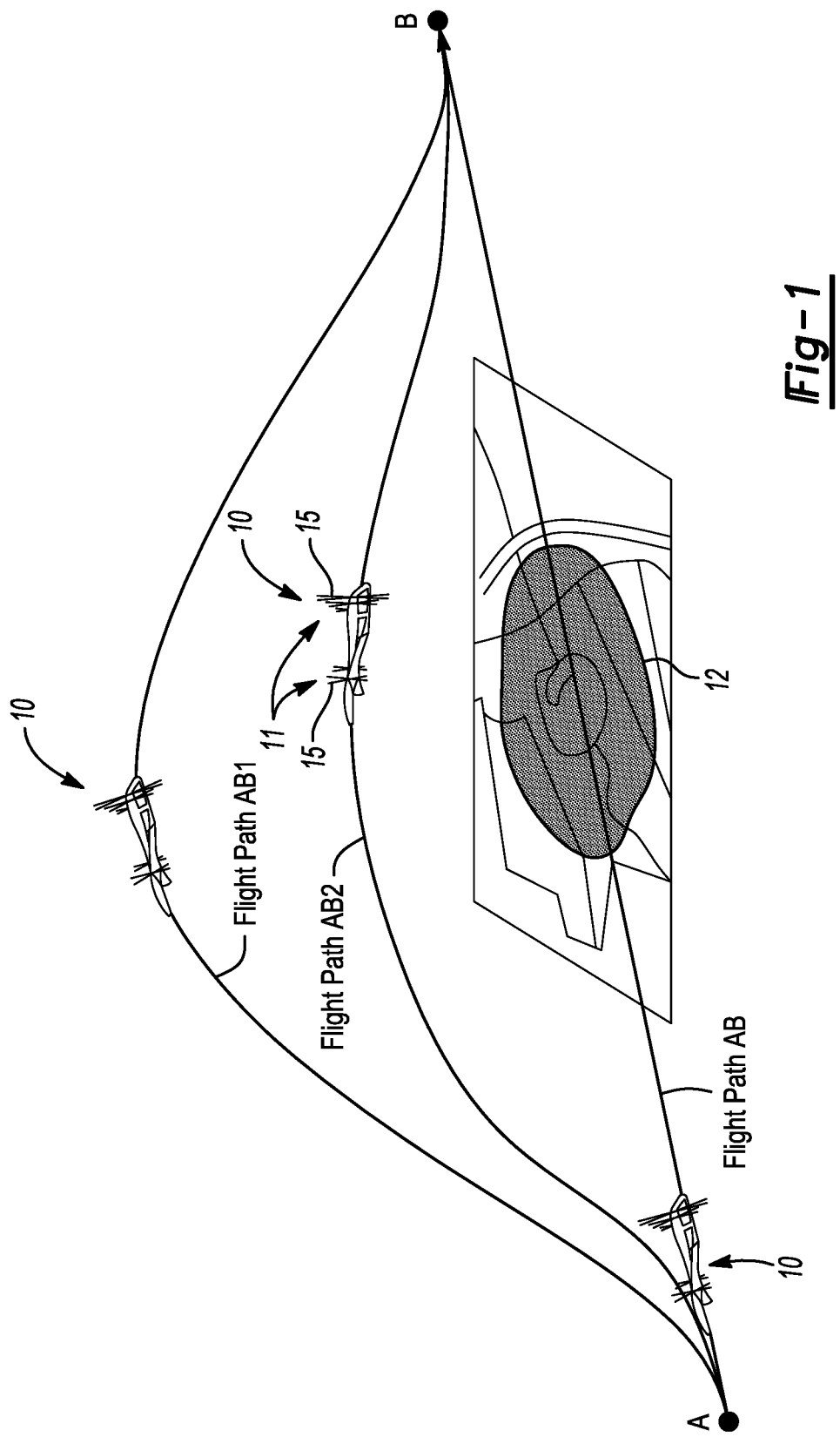
FIG. 1 is a schematic illustration of an example distributed propulsion (DP) aircraft with a DP system and traveling between an origin and destination of a flight path in proximity to a designated low-noise area, with multiple propulsors of the aircraft individually phase-controlled according to the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An example aircraft 10 as depicted in FIG. 1 includes a distributed propulsion (DP) system 11 in the form of multiple sources of propulsion, such as but not limited to propellers, rotors, fans, or other suitable propulsors 15. For illustrative consistency, the propulsors 15 of the DP system 11 will be referred to hereinafter as propellers 15 without limiting propulsion to such an embodiment.

Each propeller 15 of the aircraft 10 may be independently driven by a corresponding torque source in a DP configuration, with torque sources possibly including an engine and/or electric motors, with an all-electric variant usually referred to as a distributed electric propulsion (DEP) configuration. The propellers 15 of the DP system 11 are individually phase-controlled by an onboard control system 50 (see FIGS. 2A and 3), according to the disclosed phase control strategy. The present phase control strategy may be applied to all available propellers 15 of the DP system 11, or only to designated subgroups of the propellers 15, e.g., propellers 15 located in a predetermined area or areas of the DP aircraft 10, such as on a given side thereof. Multiple such subgroups of propellers 15 may be operated at the same time, in some embodiments. Phase control is situationally executed via transmission of a set of control signals (arrows $CC_O$ in FIG. 3), alone or in conjunction with other flight controls of the aircraft 10. The disclosed phase control methodology is intended to minimize the impact of noise that emanates from the propellers 15, propagates through the atmosphere, and is ultimately perceived within a designated low-noise area of the ground plane (GP) below the aircraft 10, i.e., proximate a flight path thereof, with one such area shown at 12 in FIG. 1.

The DP aircraft 10 may be operated with or without employing the present phase control strategy, and can switch on and off the phase control during the course of a particular flight as needed. As such, the onboard control system 50 and its phase generator module 62 (FIG. 3) may be operated automatically according to Noise Abatement Directives (NADs) or other such information. Note that because the phase generator module 62 described herein only affects the relative angular positions of the propeller blades 25 (see FIG. 7), there is no impact on flight safety in the event of system failure.

The DP aircraft 10 is depicted in FIG. 1 as traveling between a route origin (point A) and a route destination (point B) in proximity to the designated low-noise area 12. When negotiating a shortest possible flight path (i.e., a straight-line AB), the DP aircraft 10 passes directly over the low-noise area 12, and thus provides the highest acoustic signature from the perspective of an observer located on the ground plane (GP), when the aircraft 10 is operating without employing the present phase control strategy.

To meet target noise levels on the ground plane (GP) near a particularly noise-sensitive area such as the designated low-noise area 12, the DP aircraft 10 without employing the present phase control strategy will need to traverse an alternative flight path AB1 that widely circumvents low-noise area 12, thereby placing a greater stand-off distance between the aircraft and the low-noise area 12. Paths other than the shortest possible flight path AB are not desirable, as they result in penalties to flight performance including energy consumption and time to destination. Therefore, flight path AB1 represents a means of reducing the noise at the low-noise area 12 for aircraft 10 without employing the present phase control strategy, but does so with a performance penalty.

Alternatively, the DP aircraft 10 employing the present phase control strategy may meet the noise target near a particular noise-sensitive area such as the low-noise area 12 by traversing alternative flight path AB2, which is representative of a reduced stand-off distance from the low-noise area 12 relative to flight path AB1, and which consequently incurs less of a performance penalty. Such an alternative to the wide flight path AB1 of FIG. 1 may be achieved via implementation of the present phase control strategy in combination with trajectory modification and/or changes in velocity. That is, mission-time phase control of the propellers 15 can be selectively utilized alone or in conjunction with other flight controls of the aircraft 10 to direct tonal noise from the propellers 15 away from the designated low-noise areas 12 in order to minimize or eliminate deviation of an actual flight path from a desired flight path. Note that changes in the trajectory affect the level at the receiver(s) because it changes to the propagation path and consequently the spreading loss. Also, note that changes to the velocity affect the source noise, e.g., a lower propeller rotation rate results in lower propeller tip speed decreasing radiated noise.

Figure 2A:
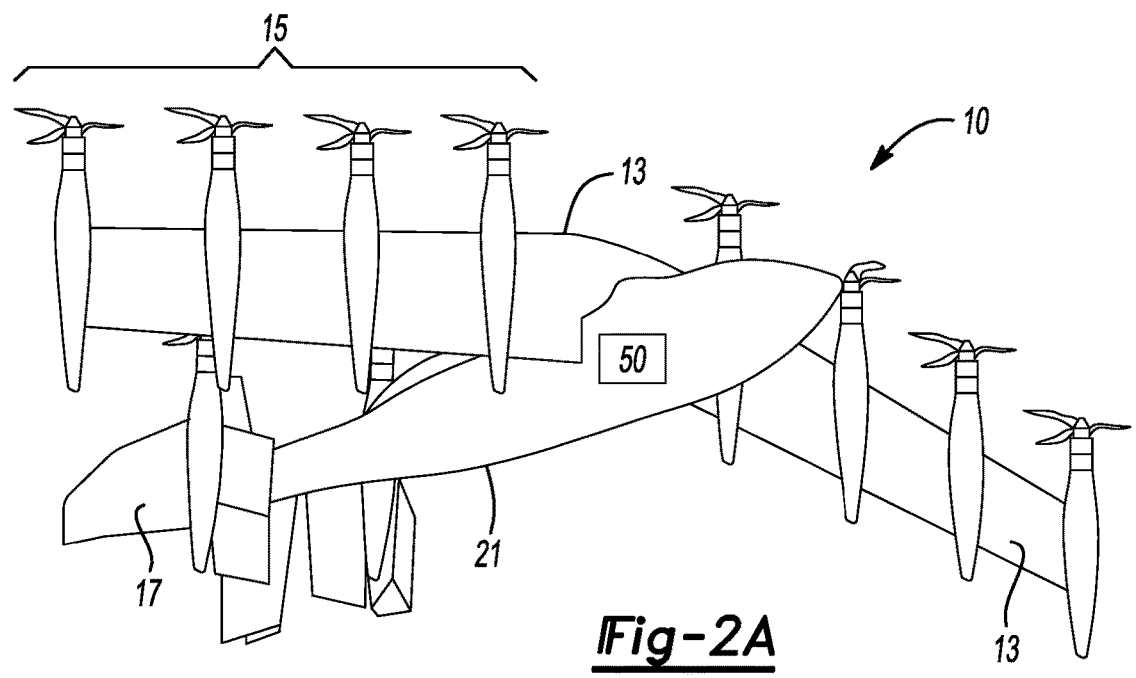
FIGS. 2A and 2B are different schematic perspective view illustrations of an example aircraft having a DP system with multiple propulsors that are phase-controlled as set forth herein.
Figure 2B:
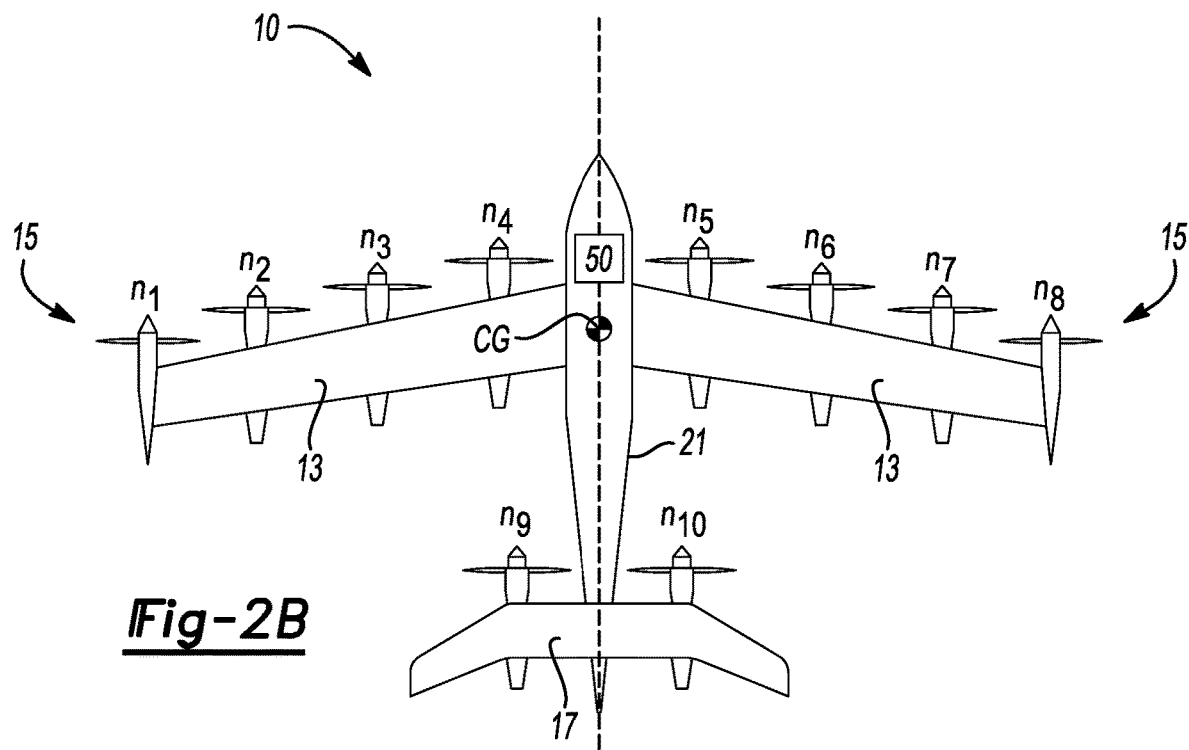

When negotiating the shortest possible flight path AB, the aircraft 10 employing the present phase control strategy will operate with reduced noise while passing over the low-noise area 12, with "reduced" being a lower noise level relative to the same aircraft 10 traversing the same flight path AB, but without employing the present phase control strategy. The aircraft 10 of FIG. 1 is further described with reference to FIGS. 2A and 2B. As depicted, the DP aircraft 10 may be optionally embodied as a vertical takeoff and landing (VTOL) aircraft 10 having an application-specific aircraft body, e.g., a fuselage 21, one or more wings 13, and/or a tail 17 or other body structure corresponding to the particular configuration of the DP aircraft 10. The aircraft 10, however, may lack such wings 13 and tail 17, for instance when configured as a "multicopter" in which the propellers 15 are positioned with respect to the aircraft body itself. FIG. 2A shows such a VTOL-capable aircraft 10 in a vertical flight mode. FIG. 2B shows the same aircraft 10 in a forward flight mode. The aircraft 10 in this non-limiting embodiment includes eight propellers 15 (four per wing 13) and two propellers 15 located along the tail 17. A wing-and tail-tilt command may allow the DP system 11 of FIG. 1 to collectively act as a set of rotors during takeoff and landing operations. Mid-flight transition occurs to enter the forward flight mode of FIG. 2B, with such a transition being treated as another flight mode.

It is important to note that the optimal phase relationship between each propeller 15, in addition to being dependent on the flight conditions, is also dependent on the flight mode. That is, an optimized set of relative phases for propellers 15 of aircraft 10 will differ between vertical, transition, and forward flight modes. The present phase control strategy takes the flight mode into account. An ultimate objective of the present control strategy is to dynamically incorporate noise constraints within overall flight control operations of the aircraft 10 using the control system 50, an example of which is shown schematically in FIG. 3. While the actual flight configuration of the aircraft 10 may vary within the scope of the disclosure, e.g., with more or fewer propellers 15 and/or different distribution or placement of such propellers 15, ideal candidate aircraft are those having multiple propellers 15, with the aircraft 10 of FIGS. 2A and 2B being an exemplary embodiment of such an aircraft.

Within the context of the exemplary control system 50 of FIG. 3, a mission requirements block ("Mission Requirements") 52 may provide a vector of waypoints to a Flight Control System or flight controller 58. The waypoints may include, for example, the 4-dimensional trajectory of the aircraft 10, i.e., time and three spatial coordinates, or time and three velocity components. The flight control system 58 uses these inputs, along with the flight dynamics model of aircraft 10, to determine the current vehicle state required to fly the specified mission, e.g., propeller thrust, heading, pitch, and roll, etc., from which the needed control parameters such as propeller rotation rate, and aerodynamic control devices such as rudder, elevator, and aileron, are determined. Other input control signals available to the flight controller 58 considered as part of the present approach include fixed and dynamically-changing parameters of the DP aircraft 10. Example fixed parameters include a number, a geometry, and/or a relative spacing of propulsors 15, e.g., propeller assemblies and constituent propeller blades, with dynamically-changing parameters possibly including a flight mode of the DP aircraft, e.g., VTOL, hover, or forward-flight, as well as an air speed of the DP aircraft, a rotational speed of the propellers 15, an attitude of the DP aircraft 10, atmospheric conditions, and/or a position of the DP aircraft 10 relative to the designated low-noise area 12.

With the flight control system or flight controller 58 of the aircraft 10, a motor controller 55, e.g., a designated logic chip, circuit, or corresponding propeller control module, provides as many output phase control signals ($CC_O$) as there are propellers 15, with the phase control signals ($CC_O$) transmitted to set the propeller rotation rates. While the term "motor" extends to electric motors in an exemplary embodiment, in other embodiments the propellers 15 may be powered some or all of the time by combustion of aircraft fuel, and thus engines and hybrid or alternative fuel-driven torque sources are included within the intended scope of the term "motor" as depicted in FIG. 3. When the aircraft 10 is operating without employing the present phase control strategy, the motor controller specifies the propeller rotation rate without regard to the relative phase of the propellers 15. Further, the propellers 15 are not required to operate at all the same rate when the aircraft 10 is operating without employing the present phase control strategy. A feedback loop (FB1) from the aircraft 10 communicates vehicle state data to the flight control system 58, which adjusts its control parameters to execute the specified mission.

When the present phase control strategy is employed, an acoustic target block 54 specifies a maximum acoustic noise level, e.g., a calibrated noise level corresponding to a particular geographic location on the ground plane (GP) of FIG. 1, to a phase generator module 62. The phase generator module 62 may be embodied as a logic block of hardware and software, e.g., an ASIC or microprocessor, collectively configured to adaptively generate an optimal phase set for propellers 15 on aircraft 10 which minimizes the noise in the direction of the noise-sensitive area(s) identified by the acoustic target block 54 acting in response to a NAD or other such information. The phase generator module 62 does so using operational feedback from the aircraft 10, including the propeller rotation rate Ω, aircraft velocity $V_f$, angle of attack a, and location of the center of gravity of the aircraft 10 with respect to the noise-sensitive area(s) on the ground plane. The generated phase set serves as part of the input control signals (arrow CO to the flight control system 58.

Note that the flight control system 58 determines the thrust (and hence the rotation rate of the propellers 15) needed to execute the mission requirements from block 52. The input control signals (arrow $CC_I$) prescribes the phase distribution at that rotation rate. When operating under the present phase control strategy, all propellers 15 within a subgroup, are required to operate at the same rate. As an example, the motor controller 55 within the flight control system 58 may vary the individual phases in a purposeful manner, i.e., non-randomly, by transiently braking or accelerating the various propellers 15 at different rates, such as using mechanical linkages or electromagnetic braking, and/or electronically via a proportional-integral-derivative (PID) control loop, doing so via its control signals ($CC_O$) to ensure that the state commands result in the desired relative phase angles. This implementation of the present phase control strategy does not have to modify the flight path or velocity along that flight path, but such an action may be separately commanded by the flight control system 58, e.g., using an outer control loop (not shown) to modify a flight trajectory of the aircraft 10 based on an error value between estimated and target noise levels as explained below. If the flight path is not modified, the tonal noise is minimized in the direction of the noise-sensitive area(s), but is not guaranteed to be below the target noise level.

The phase generator module 62 of FIG. 3 also provides a noise estimate at the noise-sensitive area(s). The difference between this noise estimate and the noise level specified in the acoustic target block 54 can serve as input to the above-noted outer control loop (not shown) of control system 50 to additionally modify the aircraft 10 trajectory and/or velocity such that the target noise level is not exceeded. The resulting trajectory (for example, path AB2 in FIG. 1) and/or velocity represents the minimum deviation from flight path AB that satisfies the acoustic target for aircraft 10 when employing the present phase control strategy. Further, the performance penalty, in terms of energy consumption or time to destination, associated with the modified path AB2 can be estimated and used to trade the noise versus performance impact.

Referring briefly to FIGS. 4A and 4B, the phase generator module 62 of FIG. 3 can operate in one of two modes. The on-line mode of FIG. 4A predicts the combined propulsor noise and adaptively generates an optimized phase set for minimum noise at the observers on the ground plane (GP) for each control loop, that is, based on the current state of the aircraft 10. The off-line mode of FIG. 4B accesses a database of flight condition dependent optimized phase sets. In this case, the optimized phase set is computed a priori and recorded in a database that is accessed by the database management system 66 (FIG. 4B), as needed, based on the current state of the aircraft 10. As such, the offline mode is also adaptive. For both modes of operation, the phase generator module 62 provides, as part of the updated input control signals $CC_I$, an optimized phase set, for each control loop.

When the phase generator module 62 is operating in its on-line mode (FIG. 4A), the phase generator module 62 has three active functional elements or logic blocks. These are (1) a source noise generator block 63, (2) a noise propagator block 64, and (3) a phase optimizer block 65. The source noise generator block 63 is configured to determine the tonal noise at a set of points at regular emission angles at a fixed radial distance in the acoustic far-field. The tonal noise is determined based on data provided by the aircraft 10 as part of feedback (FB2) to the phase generator module 62. The tonal noise data on this set of points are referred to as the source noise sphere or source noise hemisphere 30 (see FIG. 5), heretofore used interchangeably. The noise propagator block 64 is configured to interpolate the noise data at emission angles on the source noise hemisphere corresponding to the set of observers on the ground plane (GP), and to propagate that noise to the set of observers on the ground plane (GP) using one of several methods. Lastly, the phase optimizer block 65 is configured and used to determine the relative phase of the propellers 15, which results in the lowest average noise over the set of observers on the ground plane (GP). This optimized phase set constitutes the current input control signals $CC_I$ sent to the flight control system 58.

When the phase generator module 62 is operating in its off-line mode (FIG. 4B), the phase generator module 62 has one active functional element, that is, its database management system 66. The database management system 66 accesses a database of optimized phase sets based on data provided by the aircraft 10 as part of the feedback FB2 to the phase generator module 62. The database of optimized phase sets is generated a priori according to the same methods used in the phase generator's on-line mode. Such an embodiment may be useful in some applications, e.g., for increased response time when traversing a given route trajectory under essentially the same flight and/or atmospheric conditions.

Figure 5:
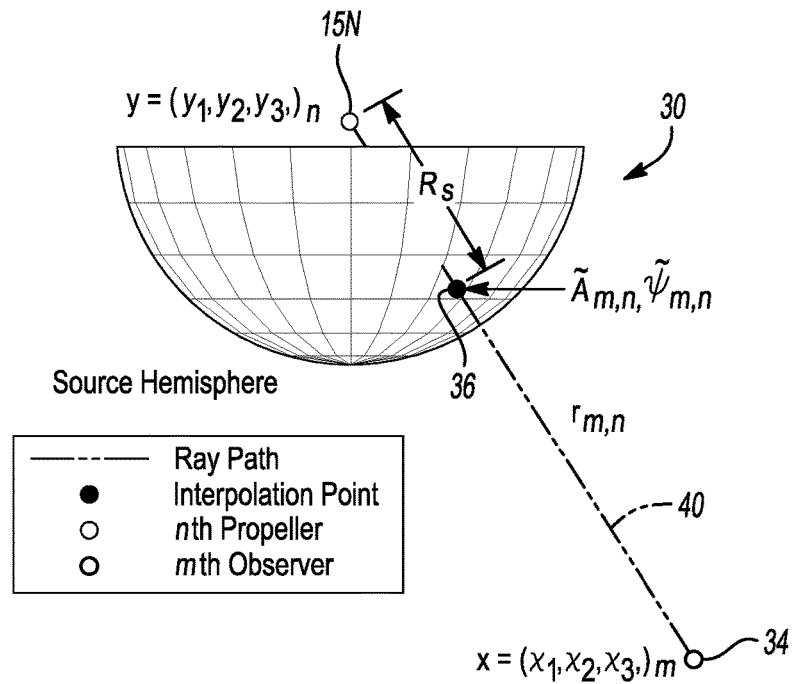
FIG. 5 is a schematic illustration of a source hemisphere in which single propeller acoustic data are obtained as set forth herein.

The source noise generator block 63 of FIG. 4A provides an estimate of the far-field propagating tonal noise data on the source noise hemisphere, at the specified operating condition of the propellers, as provided by feedback FB2 from the aircraft 10. Various acoustic models may be used within the source noise generator block 63. The fastest models often utilize blade element momentum theory to compute the pressure loadings on each propeller blade. Blade element momentum theory models include the Propeller Analysis System (PAS) disclosed by Nguygen et al., "A Users Guide for the NASA ANOPP Propeller Analysis System", NASA CR-4768 (1997), which is hereby incorporated by reference in its entirety. Models using computational fluid dynamics analysis may also be used to compute blade load loading, but come with added computational expense. Individual steady-state blade pressure loadings may be determined in this manner and used to compute acoustic pressure time histories for each propeller 15, e.g., using the formulation of the Ffowcs Williams-Hawkings equation as set forth in F. Farassat, "Theory of noise generation from moving bodies with an application to helicopter rotors," NASA TR-R-451 (1975), which is also incorporated by reference in its entirety. The acoustic pressure time histories are computed at a set of points at regular emission angles at a fixed radius $R_s$, in the acoustic far-field. The acoustic pressure, recast in complex form (amplitude A and phase for each harmonic $n_h$) at these points, represents the source noise hemisphere 30, as shown in FIG. 5. Note that, because the source noise is dependent on the flight mode, the optimal phase relationship between each propeller 15, which utilizes the source noise as input, is also dependent on the flight mode.

The second functional element of the phase generator module 62 of FIGS. 3 and 4A is the noise propagator block 64, which interpolates the noise on the source hemisphere 30 given the emission angles corresponding to the set of observers on the ground plane (GP) and the aircraft 10 position. The noise propagator block 64 then propagates that noise to the set of observers on the ground plane (GP) using one of several methods. Thus, the noise propagator block 64 is a logic block that derives an estimated noise level of the propellers 15 at the designated low-noise area 12 of FIG. 1. FIG. 5 illustrates an example source hemisphere 30 for an $n^{th}$ propeller 15 and a ray path 40 extending between an $m^{th}$ observer 34 and an interpolation point 36. The observer is positioned on the ground plane (GP) in an $x_1$, $x_2$, $x_3$ coordinate system. Here the acoustic path is taken as a straight-line, but curved ray paths accounting for refraction due to atmospheric temperature and wind variations may also be used.

The complex acoustic amplitude and phase are individually linearly interpolated along the surface of the source hemisphere 30 at the emission angle determined by the propagation path. The interpolated pressures are then phase-delayed given the known distance between the source hemisphere 30 and the ground plane (GP) on which the $m^{th}$ observer 34 and all other observers are located, and the speed of sound $c_0$ along the propagation path. The complex acoustic pressure at interpolation point 36 has a pressure amplitude $\tilde{A}$ and phase $\tilde{\psi}$. As used herein, the tilde "~" denotes an interpolated value. The acoustic phase $\psi$ with frequency f at the location of an observer m that is due to a given propeller n may be represented as:

$$\tilde{\psi}_{m,n} + k(r_{m,n} - R_S)$$

in which $$k = \frac{2\pi f}{c_0},$$

The distance $r_{m,n}$ between the acoustic source (n) and the observer (m) is defined as $|x_m - y_n|$. Spherical spreading is accounted for by scaling the pressure amplitude based on the additional distance, i.e., is $$\frac{p_m}{\tilde{A}_m}$$

is proportional to $$\frac{R_s}{r_m}.$$

The propagated noise at the m$^{th}$ observer from the n$^{th}$ propeller may be represented as:

$$p_m(t) = \sum_{n_h=1}^{N_h} \frac{R_s}{r_{m,n}} \tilde{A}_{m,n_h,n} \sin(\psi)$$

in which $$\psi = 2\pi n_h f_{0,n} t + \tilde{\psi}_{m,n_h,n} + k_{n_h}(r_{m,n} - R_s).$$

The blade passage frequency $f_{o,n} = N_b \times \text{RPM}/60$ of the n$^{th}$ propeller 15, $N_b$ is the number of blades per propeller 15, and RPM is the rotation rate in revolutions per minute. The summation occurs across the number of harmonics, $N_h$. The propeller 15 may be modeled rotating in either a counter-clockwise or a clockwise direction. Thus, a sign change is not required in the above equations to incorporate different rotation directions, as this is already captured in the interpolations. The effect of Doppler shift may be taken account in the phase term, if required, noting the aircraft 10 velocity with respect to the ground observer. Similarly, atmospheric absorption may be taken into account, if required, by one of several standard methods, attenuating the amplitude of each harmonic.

Figure 6:
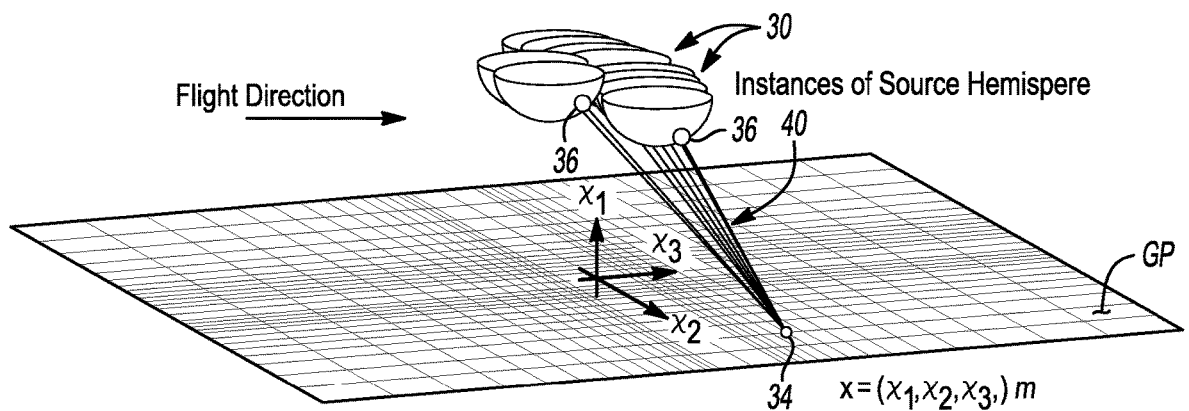
FIG. 6 is a schematic illustration of a ground plane with multiple observers positioned with respect to an example DP aircraft in forward flight, with the acoustic information estimated on each hemisphere, per propeller, and then propagated to and superposed on the ground plane.

The noise propagator block 64 of FIG. 4A uses superposition of several source noise hemispheres 30 to generate the combined noise from a DP system comprised of multiple propellers 15. FIG. 6 depicts a set of complex acoustic pressure hemispheres 30 around the various propellers 15 as the aircraft 10 of FIGS. 1 and 2B moves in a forward flight direction with respect to the ground plane (GP). The source noise hemispheres 30 are placed at the location of each propeller 15, with the aircraft 10 itself omitted for clarity from FIG. 6. The ground plane (GP) with its collective set of m observer locations $x = (x_1, x_2, x_3)_m$ is centered on the center of gravity of the aircraft 10. Straight-line propagation rays 40 from each propeller 15 to each ground observer 34 map the various propagation paths of acoustic emissions to the ground plane (GP). An intersection of each ray 40 with the source hemispheres 30 determines the query points where complex acoustic pressure is interpolated by the noise propagator block 64. Finally, the contributions of each propeller 15 can be linearly summed at the observer m as follows:

$$p_m(t) = \sum_{n=1}^{N_p} \sum_{n_h=1}^{N_h} \frac{R_s}{r_{m,n}} \tilde{A}_{m,n_h,n} \sin(\psi)$$

in which $$\psi = 2\pi n_h f_{0,n} t + \tilde{\psi}_{m,n_h,n} + k_{n_h}(r_{m,n} - R_s) + N_{b n_h} \psi_{r_n}.$$

Here, the summation occurs across the number of harmonics, $N_h$, and the number of propellers 15 in a subgroup, i.e., $N_p$. In the equation noted immediately above, $\psi_{r_n}$ adjusts the relative angular blade position (or phasing) on the interval $(0, 2\pi]$ of the full azimuth. The number of blades per propeller 15, $N_b$, is used to index the phase based on the blade passage frequency ($f_0$) and its harmonics. Note that in the present phase control strategy, the blade passage frequency must be common across $N_p$ propellers 15, that is, $f_{o,1} = f_{o,2} = \ldots = f_{o,N_p} = f_o$. As noted elsewhere herein, the number of propellers 15 are those acting together in a subgroup, which could be all of the propellers 15 or a subset thereof.

Figure 7:
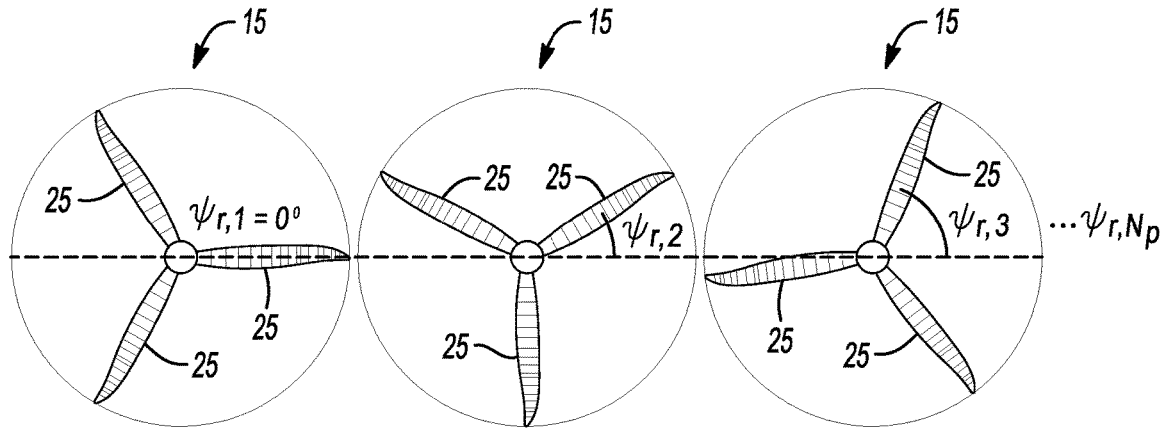
FIG. 7 is an exemplary propeller at three different relative phase angles determined according to the disclosed method.
Figure 8A:
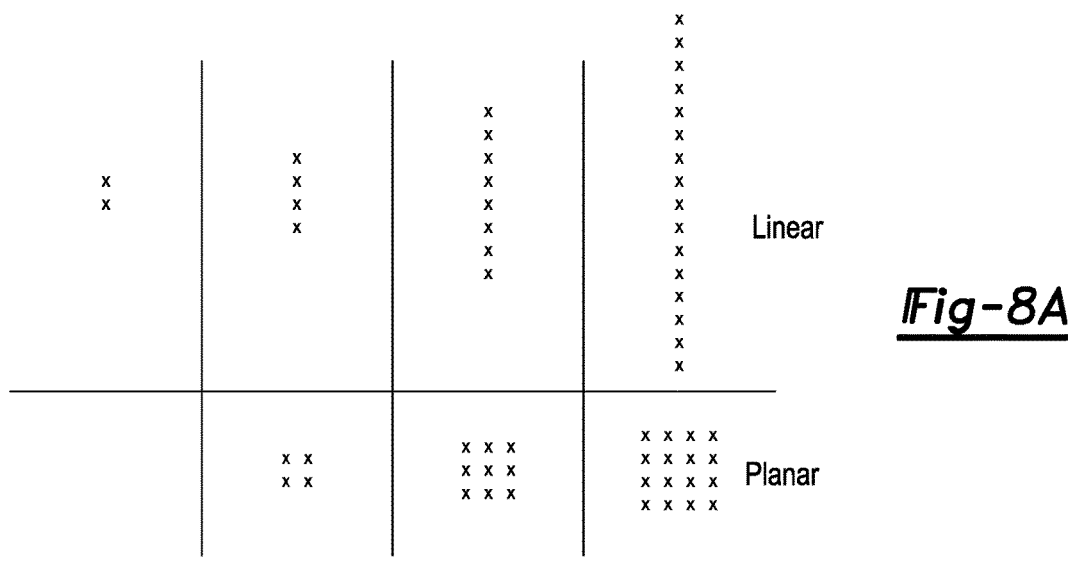
FIG. 8A is a schematic illustration of various canonical propulsor configurations, with "x" denoting a corresponding relative position of each propulsor hub.

FIG. 7 schematically depicts three representative propellers 15, each having three equally spaced propeller blades 25, with the propellers 15 at three different relative phase angles, i.e., $\psi_{r,1}$, $\psi_{r,2}$, and $\psi_{r,3}$, with $\psi_{r,1}$ serving as a reference phase angle. Phase variation may continue up to $\psi_{r,N_p}$. It should be noted that the present phase control strategy is applicable to other distributions of propellers 15 than indicated in FIGS. 1, 2A and 2B. FIG. 8A for instance depicts a top view of a canonical layout of propellers 15 for other example aircraft 10, with "x" denoting a respective position of each hub of a propeller 15. As such, FIG. 8A depicts two main configuration types, i.e., linear and planar arrays, with variation in the number of propellers 15 from two to sixteen. The linear array represents distributed propulsion along the wings 13, are found to be more amenable to directing the noise to either side of the vehicle, while the planar array shows promise for more uniform reduction at all emission angles. Other distributions of propellers 15 in a third dimension are possible and include, for example, propellers 15 on the tail 17 vertically offset from propellers 15 on the wing 13.

Figure 8B:
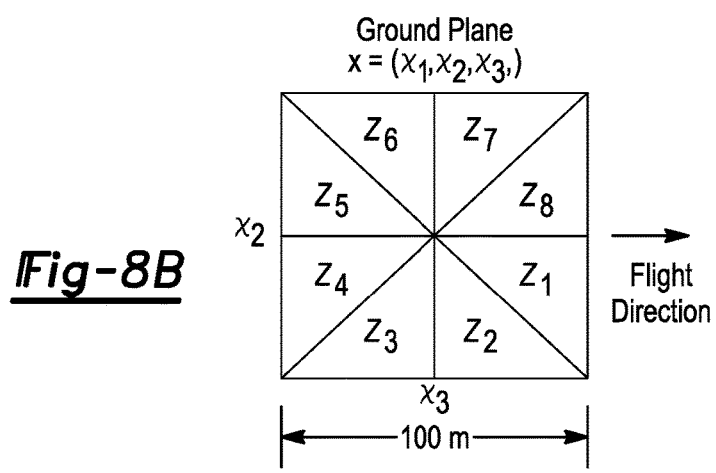
FIG. 8B is a schematic illustration of a sample ground plane broken into 45° wedges of acoustic emission angles.

The third functional element of the on-line phase generator module 62 is the phase optimizer block 65 of FIG. 4A. The function of the phase optimizer block 65 is to determine, responsive to the estimated noise levels noted above, an optimized set of propeller phases which minimize noise for a set of observers on the ground. As an example, FIG. 8B depicts a representative square ground plane broken into 45° wedges or zones ($Z_1$-$Z_8$) of observers. Other zones of the ground plane, including unequal zones, are possible. The expected number and configurations of propellers 15 makes it intractable to calculate all possible phase angle combinations when isolating an optimal combination for a set of observers on the ground. In general, the number of possible phase angle combinations ($N_c$) may be expressed as:

$$N_c = \left(\frac{2\pi}{(\Delta \psi_r N_b)}\right)^{N_p - 1}$$

where $\Delta \psi_r$ is the azimuthal resolution in radians defined relative to the total azimuth. The exponent is $N_p - 1$, as one propeller 15 is treated as the reference, e.g., $\psi_{r,1} = 0$. For a ten propeller 15 system and an example azimuthal resolution of $\Delta \psi_r = 0.0175$ radians (1°), $N_c$ is on the order of $10^{18}$. Even reducing to a coarser resolution, such as $\Delta \psi_r = 0.0873$ radians (5°), results in an $N_c$ value on the order of $10^{12}$. Further complicating matters, the calculation must be performed for every flight condition and noise reduction zone of interest. The phase optimizer block 65 of FIG. 4A used in the current phase control strategy limits the computational time and expense by employing an optimization technique to solve for optimal propeller phase set.

The optimization problem may be expressed using the following expression:

$$\min\left\{\frac{1}{M} \sum_{m=1}^{M} P_{rms,m}(f_0)\right\},$$

subject to constraints.

Figure 9:
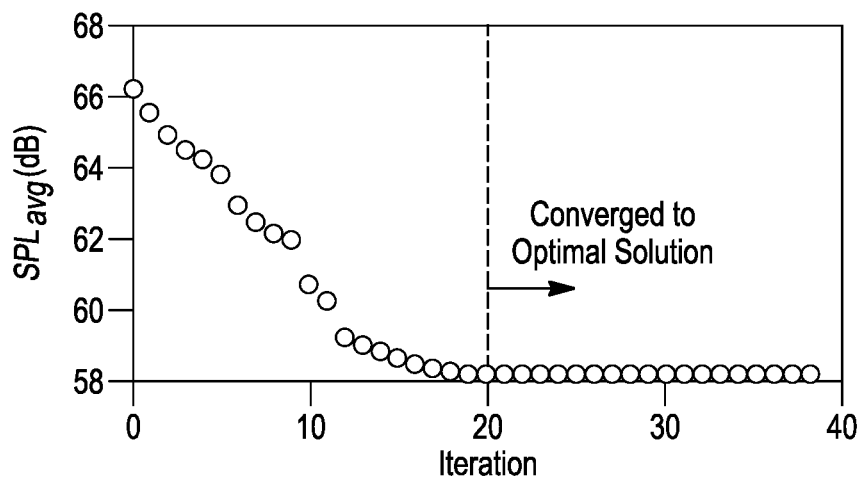
FIG. 9 is a schematic plot of spatially-averaged sound pressure level (SPL) versus a number of optimizer iterations depicting convergence on an optimal propeller phase solution.

That is, the average rms pressure of the blade passage frequency ($f_0$), and hence the average sound pressure level, $$SPL_{avg} = 20 \log_{10}\left(\frac{1}{M}\sum_{m=1}^{M} P_{rms,m}(f_0)/P_{ref}\right),$$

in which $P_{ref}$=20 μPa, over a total subset M of m individual ground observers is sought to be minimized by operation of the control system 50 of FIG. 3. The observer subsets are defined as points on the ground plane (GP) of FIG. 1 lying inside a designated zone $Z_i$, e.g., the example low-noise area 12 of FIG. 1, such that M∈$Z_i$. Using established optimization techniques, FIG. 9 shows the number of iterations of an example optimization function to ensure sufficient convergence on an optimal solution in terms of average sound pressure level ($SPL_{avg}$) in decibels (dB).

For the purposes of the present method, the phase sets of the propellers 15 are optimized by the phase optimizer block 65 independently for each observer zone. However, alternate embodiments may take into account other multiple zones simultaneously. In this manner, constraints may be imposed on other observers. For example, it may be desirable to spread acoustic energy more evenly among emission angles thereby reducing the maximum SPL of any given observer. Thus, the particular implementation of the present control strategy may be tailored to the desired performance, which in turn may be based on the requirements of the particular low-noise area 12.

Figure 10:
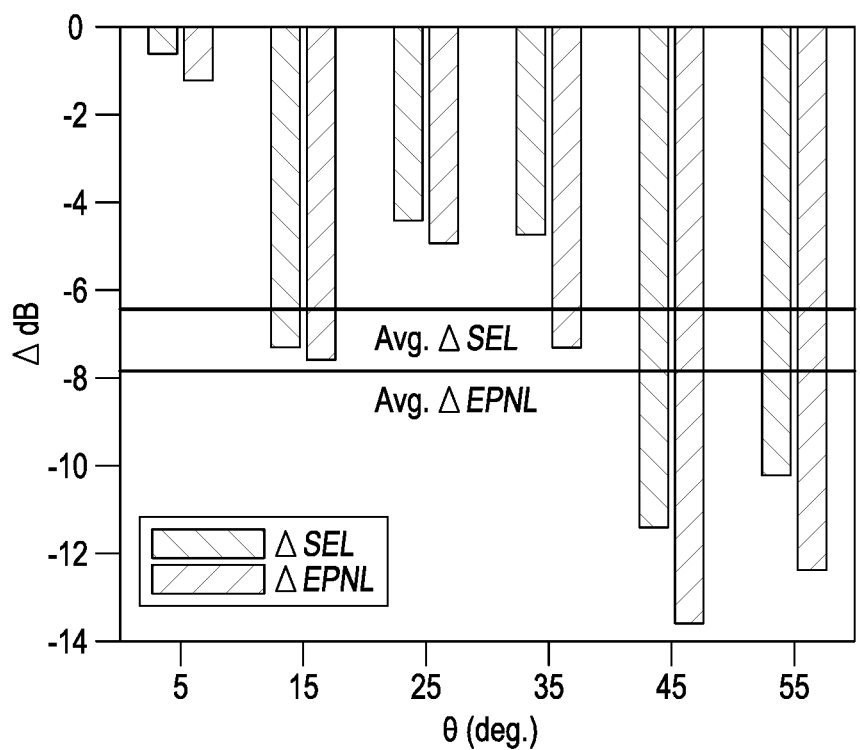
FIG. 10 is a bar graph of changes in noise levels (with respect to the reference case) on the vertical axis versus sideline observer offsets on the horizontal axis of the example aircraft in FIG. 2B.

An example of the potential benefits of the present approach for optimized phase control are depicted in FIG. 10. Shown are two measures of the sound at the ground for a set of observers at different sideline (azimuth) angles θ, ranging from 5° (nearly under the flight path) to 55° (well to the side of the flight path). In this scenario, the phase generator module 62 provides input control signals $CC_I$ that first represents an optimized phase set for zone $Z_1$ of FIG. 8B as the aircraft 10 approaches the observers, transitions to optimized phase sets for zones $Z_2$ and $Z_3$ as the aircraft 10 passes by the observers, and finally transitions to an optimized phase set for zone $Z_4$ and so forth as the aircraft 10 retreats from the observers.

The sound exposure level (SEL) and the effective perceived noise level (EPNL) are each expressed in FIG. 10 as a difference in level between noise at the observers with the aircraft 10 employing the present phase control strategy and the noise at the observers without the aircraft 10 employing a phase control strategy. In the latter case, a statistical phase-averaged level is used, that is, the average of many flybys each with a different random phase distribution. Some reduction is found at all azimuths, with greatest reductions being achieved at θ=45° and 55° in this particular case. Note that the 5° case is very close to both the edge of the optimization boundary and directly below the aircraft 10. Here, the equal angle distribution of observers within the zone results in weighting the optimization toward the more extreme angles. Alternatively, an equal distribution of observers on the ground plane would eliminate that weighting. Very importantly, reduction in sound pressure level at the ground observer is not accompanied by a reduction in performance, as all propellers rotate at a constant rate except over the short transitions between optimized wedges. Consequently, the power consumed is neither increased nor decreased, and the velocity and time to destination are unaffected.

In general, the present teachings may be advantageously applied (noise reduction greater than 10 dB) when the coherence of the radiating acoustics between propellers is no lower than 0.9. The coherence is a function of the phase error. Based on the state of current technology, such error is not expected to degrade the coherence below 0.9, and thus the present approach remains a viable option for achieving beneficial noise reduction in DP-equipped aircraft.

As will be appreciated by one of ordinary skill in the art in view of FIGS. 1-10 and the supporting disclosure, mission-time phasing of subgroups or all of the various propellers 15 may be selectively used to direct noise from the propellers 15 away from a particular designated low-noise area rather than altering a flight path. The present strategy thus provides a method for favorably modifying a spatial distribution of noise emanating from the aircraft 10. While the flight path may also be modified if so desired, whether autonomously or via a human pilot, the present approach minimizes the need for such path deviation. These and other benefits will be readily appreciated by those of ordinary skill in the art in view of this disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a group of propulsors aboard a distributed propulsion (DP) aircraft, wherein each propulsor of the group of propulsors includes a respective blade set, each of the respective blade sets defining a rotation rate and a relative azimuthal angular blade position relative to each remaining one of the respective blade sets, and also defining, in use, a blade passage frequency that is a function of the rotation rate and a number of blades in each of the respective blade sets, the DP aircraft having a control system; the control system including a phase generator module and a flight controller, the method comprising:

deriving, via the phase generator module in response to input signals, an estimated source noise level of the propulsors;

deriving, via the phase generator module using the estimated source noise level, an estimated ground noise level in a designated low-noise area located on a ground plane proximate a flight path of the DP aircraft;

determining an optimized set of the relative azimuthal angular blade positions of each of the respective blade sets via the phase generator module, wherein the optimized set of the relative azimuthal angular blade positions is calibrated utilizing a set comprising a plurality of spaced-apart observer locations on the ground plane to simultaneously minimize the estimated ground noise level at the plurality of spaced-apart observer locations on the ground plane;

transmitting flight control signals via the flight controller to modify the flight path of the DP aircraft based on the estimated ground noise and responsive to the optimized set of the relative azimuthal angular blade positions; and transmitting control signals from the flight controller to one or more of the propulsors to thereby establish the optimized set of the relative azimuthal angular blade positions, and to maintain the optimized set of the relative azimuthal angular blade positions by maintaining an equal blade passage frequency for all blade sets in the group of propulsors.

2. The method of claim 1, wherein the propulsors include propeller assemblies, and the respective blade sets each include a respective plurality of propeller blades, and wherein the input signals include:
fixed parameters of the DP aircraft, including a number, a geometry, and a relative spacing of the propeller assemblies and the plurality of propeller blades; and
dynamically-changing parameters, including a flight mode of the DP aircraft, an air speed of the DP aircraft, a rotational speed of the propellers, an attitude of the DP aircraft, atmospheric conditions, and a position of the DP aircraft relative to the designated low-noise area.

3. The method of claim 1, wherein deriving the estimated ground noise level includes determining, via a noise propagator block of the phase generator module, a set of individual ray paths extending between each of the propulsors and each of the spaced-apart observer locations.

4. The method of claim 1, wherein deriving the estimated source noise level includes using an acoustic model of a source noise generator block, and wherein a calibrated noise level comprises a minimum average sound pressure level over the plurality of spaced-apart observer locations.

5. The method of claim 1, wherein determining the optimized set of the relative azimuthal angular blade positions includes using an optimizer function of a phase optimizer block of the phase generator module to derive the optimized set of the relative azimuthal angular blade positions.

6. The method of claim 1, wherein the phase generator module includes a database populated with a table of predetermined relative azimuthal angular blade positions and corresponding operating conditions for the predetermined relative azimuthal angular blade positions, the method further comprising:
extracting the optimized set of the relative azimuthal angular blade positions from the table under actual operating conditions that match the corresponding operating conditions.

7. The method of claim 1, further comprising deriving the estimated ground noise level in mission-time, and deriving the optimized set of the relative azimuthal angular blade positions in the mission-time.

8. The method of claim 1, wherein transmitting the control signals to the one or more respective propulsors includes transmitting the control signals to a designated subgroup of the propulsors located in one or more predetermined areas of the DP aircraft.

9. The method of claim 1, wherein the control signals include rate control signals transmitted from the flight controller to the one or more of the propulsors to operate at a same rotational rate while maintaining the relative angular positions between the respective blade sets.

10. The method of claim 1, further comprising:
determining if the estimated ground noise level exceeds a maximum acoustic noise level for the designated low-noise area;
responsive to the estimated ground noise level exceeding the maximum acoustic noise level, determining a noise level difference between the estimated ground noise level and the maximum acoustic noise level; and
modifying a trajectory and/or a velocity of the DP aircraft through a closed-loop feedback signal based on the noise level difference to achieve the alternative flight path.

11. The method of claim 1, wherein determining the optimized set of relative azimuthal angular blade positions includes:
determining, via a source noise generator block of the phase generator module, a tonal noise of the propulsors at a set of points at regular emission angles at a fixed radial distance in an acoustic far-field relative to the designated low-noise area;
interpolating, via a noise propagator block of the phase generator module, the tonal noise data at emission angles on a source noise hemisphere corresponding to a set of spaced-apart observers; and
deriving, via a phase optimizer block of the phase generator module based on the interpolated tonal noise data, the optimized set of relative azimuthal angular blade positions that results in a lowest average noise over the set of spaced-apart observers on the ground plane.

12. A flight control system for a distributed propulsion (DP) aircraft, the DP aircraft having a plurality of propulsors for propulsion of the DP aircraft, each of the propulsors including a respective blade set, each of the respective blade sets defining a relative azimuthal angular blade position relative to each remaining one of the respective blade sets and, in use, a blade passage frequency, the flight control system comprising:
a phase generator module including:
a source noise generator block configured to derive an estimated source noise level of the propulsors using an acoustic model;
a noise propagator block configured, in response to the estimated source noise level, to estimate a ground noise level of the propulsors in a predetermined low-noise area located on a ground plane proximate a flight path of the DP aircraft; and
a phase optimizer block configured to determine an optimized set of relative azimuthal angular blade positions using an optimizer function, wherein the optimized set of the relative azimuthal angular blade positions defines relative angular positions between the respective blade sets calibrated utilizing a set comprising a plurality of spaced-apart observers on the ground plane to
simultaneously minimize the estimated ground noise level at the plurality of spaced-apart observer locations on the ground plane; and
a flight controller configured to:
transmit flight control signals to modify the flight path of the DP aircraft based on the estimated ground noise and responsive to the optimized set of the relative azimuthal angular blade positions; and
transmit control signals to one or more of the propulsors to thereby establish the optimized set of the relative azimuthal angular blade positions, and to maintain the optimized set of the relative azimuthal angular blade positions by maintaining an equal blade passage frequency for all blade sets in the group of propulsors.

13. The flight control system of claim 12, wherein a calibrated noise level comprises a minimum average sound pressure level over the plurality of spaced-apart observer locations, and wherein the propulsors include a plurality of propeller assemblies, and the respective blade sets each include a plurality of propeller blades, and the input signals include:

fixed parameters of the DP aircraft, including a number, a geometry, and relative spacing of the propeller blades; and dynamically-changing parameters, including a flight mode of the DP aircraft, an air speed of the DP aircraft, a rotational speed of the plurality of propellers, an attitude of the DP aircraft, atmospheric conditions; and a relative position of the DP aircraft relative to the designated low-noise area.

14. The flight control system of claim 12, further comprising a database with a table of predetermined relative azimuthal angular blade positions and corresponding operating conditions, the phase generator module being further configured to extract the optimized set of the relative azimuthal blade positions from the table under actual operating conditions that match the corresponding operating conditions of the table.

15. A distributed propulsion (DP) aircraft comprising:
an aircraft body;
a group of propulsors distributed with respect to each other and the aircraft body, each of the propulsors including a respective blade set defining a relative azimuthal angular blade position relative to each remaining one of the respective blade sets and, in use, a blade passage frequency;
a flight controller in communication with the propulsors and configured, responsive to a set of optimized relative azimuthal angular blade positions, to output corresponding commands to the propulsors to control the azimuthal angular blade positions; and a phase generator module in communication with the flight controller and configured to:
derive, in response to a set of input signals, an estimated source noise level of the propulsors with respect to a designated low-noise area located on a ground plane proximate a flight path of the DP aircraft;
estimate a ground noise level at a plurality of spaced-apart observer locations, including generating individual ray paths between each of the propulsors and each of the observer locations to thereby account for atmospheric propagation effects on the estimated source noise level;
responsive to the estimated ground noise level, determine an optimized set of the relative azimuthal angular blade positions, wherein the optimized set of the relative azimuthal angular blade positions is calibrated utilizing a set comprising a plurality of spaced-apart observers on the ground plane to simultaneously minimize the estimated ground noise level at the plurality of spaced-apart observers on the ground plane; and
transmit the optimized set of relative azimuthal angular blade positions to the flight controller,
wherein the flight controller is configured to: transmit flight control signals to change the flight path of the DP aircraft to an alternative flight path based on the estimated ground noise and responsive to the optimized set of the relative azimuthal angular blade positions, and transmit control signals to one or more of the propulsors to establish the optimized set of the relative azimuthal angular blade positions, and to maintain the relative azimuthal angular blade positions in the optimized set by maintaining an equal blade passage frequency for all blade sets in the group of propulsors.

16. The DP aircraft of claim 15, wherein the propulsors include a plurality of propeller assemblies, and the respective blade sets each include a plurality of propeller blades.

17. The DP aircraft of claim 16, wherein the aircraft body includes one or more wings and/or a tail, and wherein the propeller assemblies are spatially distributed either on or off of at least one of the one or more wings and/or the tail.

18. The DP aircraft of claim 16, wherein the set of input signals includes:
fixed parameters of the DP aircraft, including a number, a geometry, and a relative spacing of the propeller blades; and
dynamically-changing parameters, including a flight mode of the DP aircraft, an air speed of the DP aircraft, a rotational speed of the plurality of propellers, an attitude of the DP aircraft, atmospheric conditions, and a relative position of the DP aircraft relative to the designated low-noise area.

19. The DP aircraft of claim 15, wherein the phase generator module includes a database populated with a table of relative azimuthal angular blade positions and corresponding operating conditions, and wherein the phase generator module is configured to extract the optimized set of the azimuthal angular blade positions from the table in real-time when the DP aircraft is flown under operating conditions matching the corresponding operating conditions.

20. The DP aircraft of claim 15, wherein the flight controller is configured to transmit the flight control signals to a designated subgroup of the propulsors located in a corresponding area of the DP aircraft.

* * * * *